United States Patent
Kagami et al.

(10) Patent No.: US 6,529,344 B1
(45) Date of Patent: Mar. 4, 2003

(54) METHOD AND SYSTEM FOR COMPENSATING A HEAD POSITIONING SERVO IN A STORAGE DEVICE

(75) Inventors: Naoyuki Kagami, Fujisawa (JP); Akira Tokizono, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/426,425

(22) Filed: Oct. 25, 1999

(30) Foreign Application Priority Data

Oct. 26, 1998 (JP) .......................................... 10-303543

(51) Int. Cl.[7] ............................................. G11B 5/596
(52) U.S. Cl. ................................................... 360/77.08
(58) Field of Search ........................ 360/77.08, 77.05, 360/75, 77.04, 77.11, 78.05

(56) References Cited

U.S. PATENT DOCUMENTS

| | | | | |
|---|---|---|---|---|
| 5,369,345 A | * | 11/1994 | Phan et al. ............... | 318/561 |
| 5,404,255 A | * | 4/1995 | Kobayashi et al. ....... | 360/78.09 |
| 5,583,713 A | * | 12/1996 | Real et al. ............... | 360/77.08 |
| 5,600,506 A | * | 2/1997 | Baum et al. .............. | 360/78.14 |
| 5,774,299 A | * | 6/1998 | Baum et al. .............. | 360/77.08 |
| 5,872,677 A | | 2/1999 | Kagami et al. | |
| 6,204,988 B1 | * | 3/2001 | Codilian et al. ........... | 360/75 |

FOREIGN PATENT DOCUMENTS

JP 9180388 A2 7/1997

* cited by examiner

Primary Examiner—David Hudspeth
Assistant Examiner—K. Wong
(74) Attorney, Agent, or Firm—Randall J. Bluestone; Bracewell & Patterson, L.L.P.

(57) ABSTRACT

A method and system for compensating head positioning servo in a storage device. In accordance with the method and apparatus of the present invention, an open-loop gain of a head positioning servo is calculated when the head positioning servo causes a head to follow a predetermined position of a target track of a storage media surface by generating a position detecting signal utilizing a position detecting signal gain. A compensated position detecting signal gain is generated by compensating the position detecting signal gain according to a difference between a first predetermined value and the open-loop gain of the head positioning servo, such that variability of the position detecting signal and the open-loop gain is reduced to achieve stability in a head positioning servo.

14 Claims, 9 Drawing Sheets

|  | HE(0) | HE(1) | HE(2) | HE(3) | HE(4) | HE(5) | HE(6) | HE(7) | HE(8) | HE(9) |
|---|---|---|---|---|---|---|---|---|---|---|
| PES GAIN TABLE | H(0) | H(1) | H(2) | H(3) | H(4) | H(5) | H(6) | H(7) | H(8) | H(9) |
| Cont GAIN TABLE | K(0) | K(1) | K(2) | K(3) | K(4) | K(5) | K(6) | K(7) | K(8) | K(9) |

*Table 1*

| | |
|---|---|
| Noise Table | 0000, 0001, 0001, 0002, 0002, 0002, 0002 0001, 0001, 0000, 0000, FFFF, FFFF, FFFE FFFE, FFFE, FFFE, FFFF, 0000 |
| Sine Table | 0000, 0053, 009D, 00D6, 00F7, 00FE, 00EA 00BC, 0079, 002A, 00D6, FF87, FF44, FF02 FF02, FF09, FF2B, FF64, FFAD |
| Cos Table | 00FF, 00F1, 00C9, 008C, 003F, FFEB, FF9A FF53, FF20, FF05, FF05, FF20, FF53, FFEB FFEB, 003F, 008C, 00C9, 00F1 |

*Table 2*

|  | HE(0) | HE(1) | HE(2) | HE(3) | HE(4) | HE(5) | HE(6) | HE(7) | HE(8) | HE(9) |
|---|---|---|---|---|---|---|---|---|---|---|
| ZO(0) | H(0,0) | H(1,0) | H(2,0) | H(3,0) | H(4,0) | H(5,0) | H(6,0) | H(7,0) | H(8,0) | H(9,0) |
| ZO(1) | H(0,1) | H(1,1) | H(2,1) | H(3,1) | H(4,1) | H(5,1) | H(6,1) | H(7,1) | H(8,1) | H(9,1) |
| ZO(2) | H(0,2) | H(1,2) | H(2,2) | H(3,2) | H(4,2) | H(5,2) | H(6,2) | H(7,2) | H(8,2) | H(9,2) |
| ZO(3) | H(0,3) | H(1,3) | H(2,3) | H(3,3) | H(4,3) | H(5,3) | H(6,3) | H(7,3) | H(8,3) | H(9,3) |

*Table 3*

METHOD AND SYSTEM FOR COMPENSATING A HEAD POSITIONING SERVO IN A STORAGE DEVICE

BACKGROUND OF THE INVENTION

1. Technical Field

The present invention relates to an improved storage device and in particular to an improved method and system for compensating a head positioning servo within a storage device. Still more particularly, the present invention relates to an improved method and system for maintaining the stability of a head positioning servo utilized with a storage device having multiple heads and reducing the variation of the head positioning servo stability from one head to another head, such that a head for writing to and reading from a storage media device accurately follows a target position of the storage media device surface.

2. Description of the Related Art

One method for compensating head positioning servo is, for example, disclosed in Japanese Patent Kokai Publication No. 09-180388 (hereafter referred to as document A). The method disclosed in document A involves compensation of a position detecting signal or positioning error signal(PES). PES is a signal indicating a head position on a disk surface and consists of a main position detecting signal identified as a main positioning error signal(MPES) and a slave position detecting signal identified as a slave positioning error signal (SPES). A burst pattern formed on the disk surface is read by the head, and a MPES and a SPES are generated according to the read signal and a position detecting signal gain H. The disk surface is partitioned into multiple tracks. The MPES is utilized when the PES is in a certain range of positions in the multiple tracks while the SPES is utilized when the PES is in a remaining range of positions in the multiple tracks.

The method disclosed in document A further includes a step for compensating the position detecting signal gain H of each head in the disk apparatus having multiple disk surfaces and multiple heads corresponding to the individual disk surfaces, so that the MPES and the SPES make a good continuous linkage irrespective of the head to be controlled.

By a second method for compensating head positioning servo, the open-loop gain of the servo (i.e., servo loop gain) is measured for each head, and, if there is a difference between the measured open-loop gain and the design value, a drive control signal gain K, utilized for a drive control signal, is compensated in order to attain stable operation of the servo. The drive control signal is a signal for controlling a driver which moves the head and is generated so as to have a value, according to the PES, that is the difference between the head position and the target position, and the drive control signal gain K.

The PES compensation method described in document A may cause a decrease in the inclination of the PES (referred to as dullness) around the linkage of the MPES and the SPES. For instance, the PES may become dull as depicted by a dotted line (B) in FIG. 8 while a standard PES should be as shown as a solid line (A) in FIG. 8. If the PES becomes dull, the inclination of the PES increases in the transverse center of the track. The traverse center is indicated as the physical position 0 in FIG. 8. This inclination of the PES makes the open-loop gain of the head positioning servo too high and makes the servo operation unstable, which may result in frequent data write errors. To avoid this problem, a second prior art method, which measures the open-loop gain and compensates the drive control signal gain K according to the measured open-loop gain, has been utilized.

However, the second prior art method for compensating the drive control signal gain K as described above does not directly compensate the PES gain H, which corresponds to the inclination of the PES. Therefore, the variability of the PES is high with respect to the amount of physical travel of the head. In particular, the variability of the PES is high with respect to the amount of physical travel of the head in the transverse center of the track, which corresponds to the center of the MPES. Further, the variability of the PES is high on the boundary of the track, which corresponds to the center of the SPES. Moreover, the inclination of the PES varies from head to head. If the inclination of the PES is too large in the track center or varies by head, as described above, it is not ensured that the head follows an exact target position (data write position or read position) in a track.

In view of the aforementioned, it is desirable to provide improved compensation for head positioning servo which causes a head for writing to or reading from a disk to accurately follow a target position on the disk surface. Further, it is desirable to provide improved stability of the compensated head positioning servo for each head and between multiple heads.

SUMMARY OF THE INVENTION

In view of the foregoing, it is therefore an object of the present invention to provide an improved storage device.

It is another object of the present invention to provide an improved method and system for compensating a head positioning servo within a storage device.

It is yet another object of the present invention to provide an improved method and system for maintaining the stability of a head positioning servo utilized with a storage device having multiple heads and reducing the variation of the head positioning servo stability from one head to another head, such that a head for writing to and reading from a storage media device accurately follows a target position of the storage media device surface.

In accordance with the method and apparatus of the present invention, an open-loop gain of a head positioning servo is calculated when the head positioning servo causes a head to follow a predetermined position of a target track of a storage media surface by generating a position detecting signal utilizing a position detecting signal gain. A compensated position detecting signal gain is generated by compensating the position detecting signal gain according to a difference between a first predetermined value and the open-loop gain of the head positioning servo, such that variability of the position detecting signal and the open-loop gain is reduced to achieve stability in a head positioning servo.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings.

DETAILED DESCRIPTION OF THE PREFERRED EMBODIMENT

Figure 1:
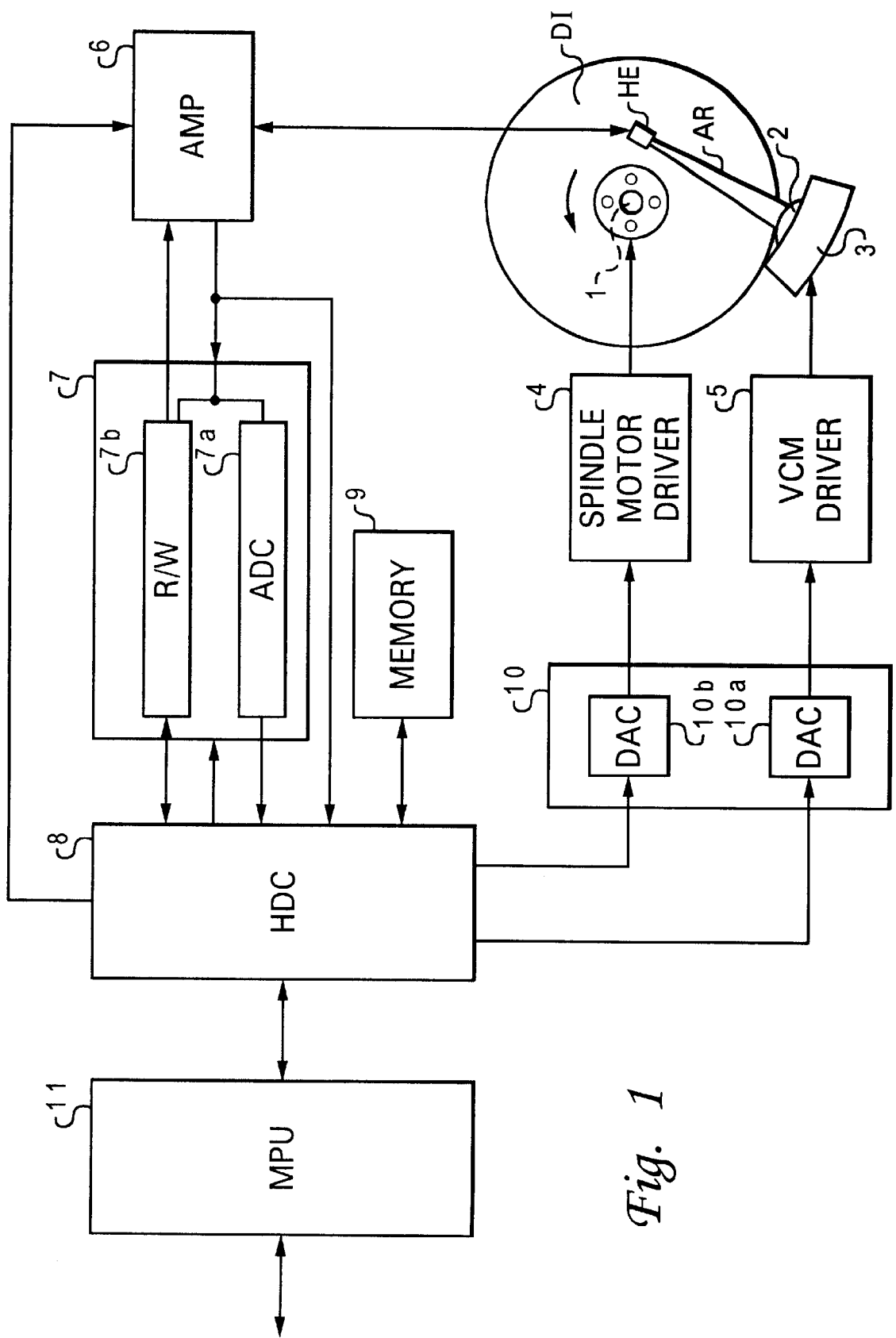
FIG. 1 depicts a block diagram of a configuration of the disk apparatus in accordance with a preferred embodiment of the present invention.

Referring now to the Figures and in particular with reference now to FIG. 1, there is depicted a block diagram of a disk apparatus configuration in accordance with a preferred embodiment of the present invention. The disk apparatus of FIG. 1 depicts multiple magnetic disks DI as data recording media, a spindle motor 1 for rotating magnetic disks DI, multiple magnetic heads HE, a carriage 2 equipped with multiple access arms AR, a voice coil motor (VCM) 3 for swinging carriage 2, a spindle motor driver 4, a VCM driver 5, an amplifier 6, a read/write channel module (R/W channel module) 7, a hard disk controller (HDC) 8, a memory 9, a digital-to-analog conversion module 10, and a microprocessor unit (MPU) 11. The R/W channel module 7 is illustrated containing an analog-to-digital converter (ADC) 7a and a R/W channel 7b. Further, the digital-to-analog conversion module 10 is depicted containing digital-to-analog converters (DAC) 10a and 10b.

Figure 2:
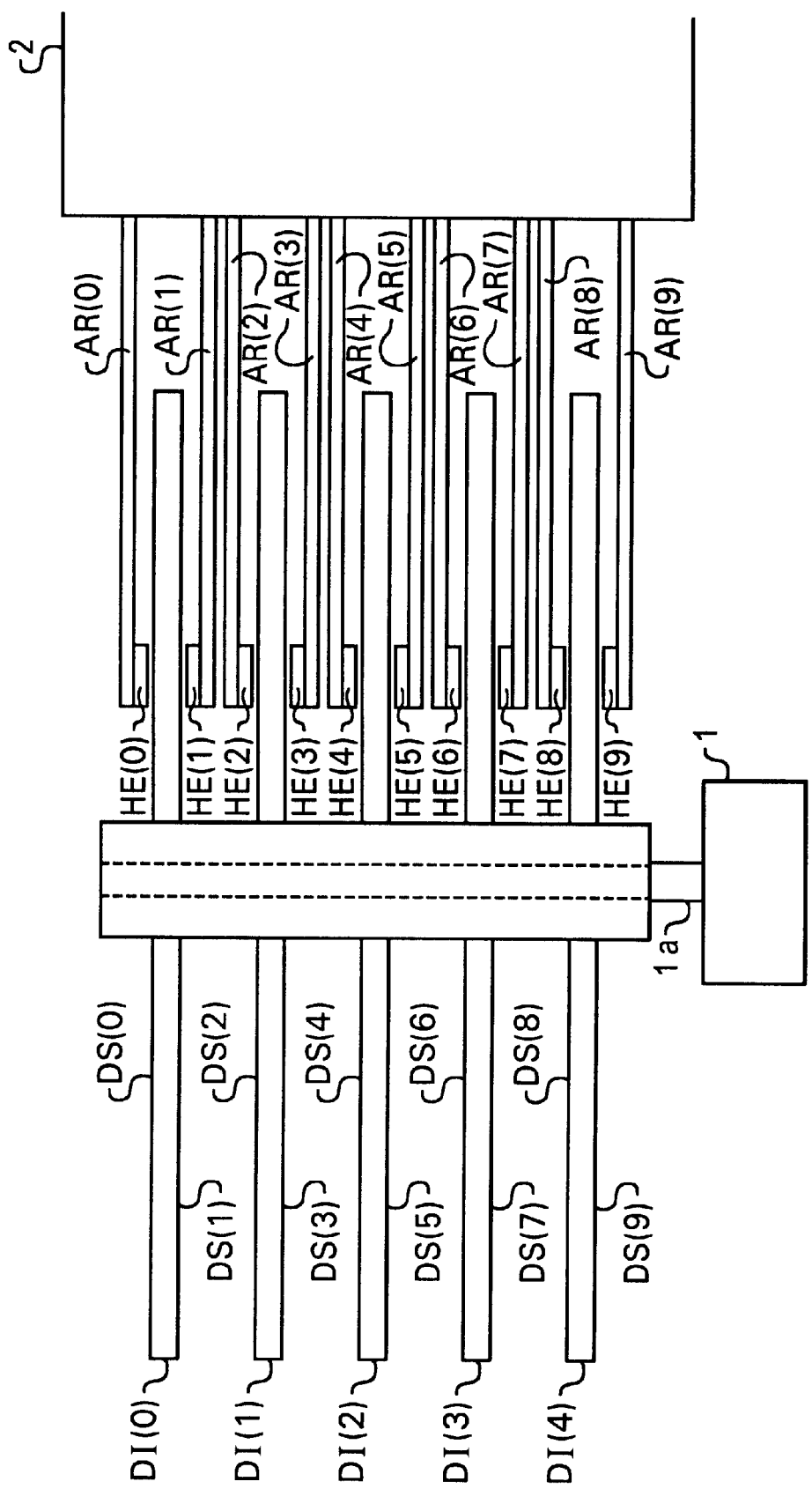
FIG. 2 illustrates a schematic cross section depicting construction in the vicinity of magnetic disks in the disk apparatus in accordance with a preferred embodiment of the present invention.

Referring now to FIG. 2, there is illustrated a cross-sectional illustration of multiple magnetic disks within a disk appartus, in accorance with a preferred embodiment of the present invention. Each magnetic disk DI is a hard, thin, circular plate on which a magnetic material is coated or sputtered. Thereby, data can be recorded on both surfaces of each magnetic disk DI.

As depicted in FIG. 2, five magnetic disks DI(0)–DI(4) are securely mounted on a shaft 1a of spindle motor 1. Data can be recorded on both surfaces DS(0)–DS(9) of magnetic disks DI(0)–DI(4). In particular, magnetic disks DI(0)–DI(4) are securely mounted on shaft 1a of spindle motor 1 in such a manner that the centers of magnetic disks DI(0)–DI(4) are aligned with shaft 1a and the opposite disk surfaces of the adjacent magnetic disks (disk surface DS(1) of disk DI(0) and disk surface DS(2) of disk DI(1), for instance) are placed at predetermined intervals. Magnetic disks DI(0)–DI(4) integrally rotate with shaft 1a when spindle motor 1 is driven.

Returning now to FIG. 1, magnetic head HE is mounted on access arm AR and reads data recorded on the magnetic disk DI or writes data into magnetic disk DI. The access arm AR is securely mounted on carriage 2 and integrally swings with carriage 2 to move head HE in a radial direction of magnetic disk DI. Head HE and arm AR are provided for each disk surface DS. In FIG. 2, ten arms AR are securely mounted on carriage 2 for disk surfaces DS(0)–DS(9), and the ten arms AR are each equipped with a head HE. Each head HE is assigned a head identification number x, where in the present example x preferably denotes integer values from 0 to 9. The head HE for the disk surface DS(x) with the head identification number x is hereafter represented as HE(x), and the arm equipped with the head HE(x) is represented as AR(x).

Figure 3:
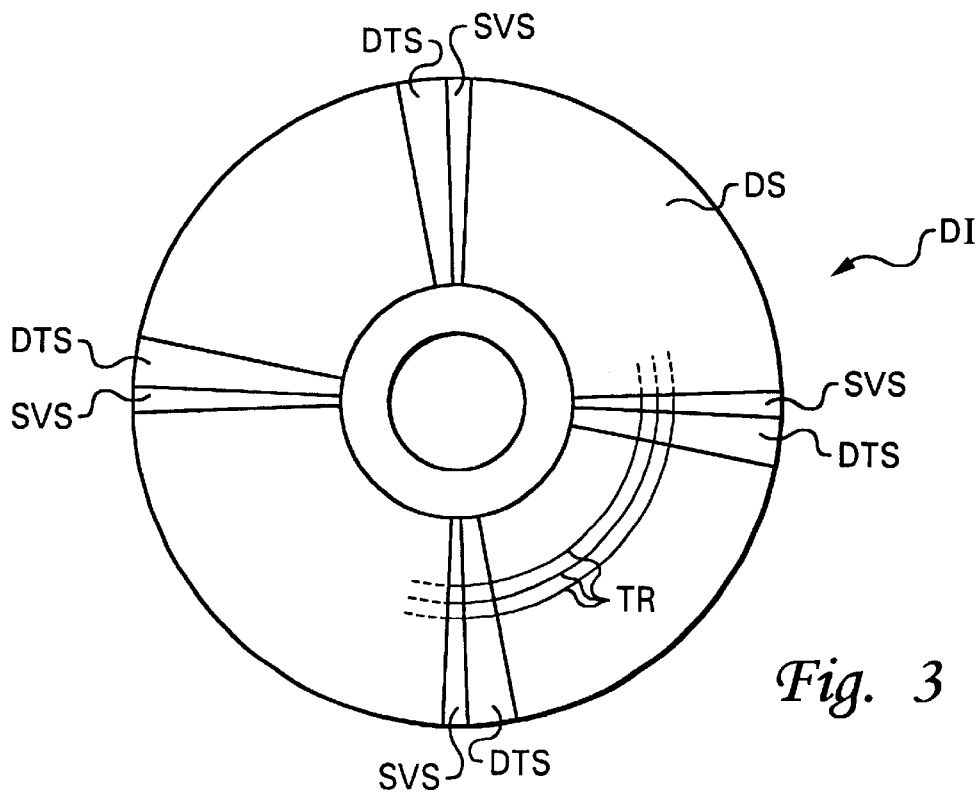
FIG. 3 depicts a configuration of a disk surface in the disk apparatus in accordance with a preferred embodiment of the present invention.

With reference now to FIG. 3, there is depicted an illustration of a disk surface in accordance with a preferred embodiment of the present invention. A disk surface DS(x) is illustrated which is partitioned into a number of recording tracks TR. Each track TR on disk surface DS(x) is assigned a track identification number y. For instance, disk surface DS(x) may be partitioned into 1150 tracks where the radially innermost track is assigned a track identification number y=0 and the radially outermost track is assigned a track identification number y=1149. Hereafter, a track TR with the track identification number y is represented as TR(y), where y denotes any integer from 0 to 1149, however in alternate embodiments other ranges of integers may be utilized.

With reference still to FIG. 3, the tracks TR in radially identical positions on disk surfaces DS(0)–DS(9) are assigned identical track identification numbers TRKID (not shown). Therefore, ten tracks TR(y) on disk surfaces DS(0)–DS(9) form a cylindrical figure. So, track identification number TRKID is also referred to as a cylinder identification number.

Further, track TR(y) is partitioned into multiple data sectors DTS and multiple servo sectors SVS. Data sectors DTS and servo sectors SVS are alternately placed in the circumferential direction of track TR(y). Each servo sector SVS in track TR(y) is assigned a physical sector identification number w. For instance, track TR(y) includes seventy eight data sectors DTS and seventy eight servo sectors SVS. The servo sector SVS having the physical sector identification number w is hereafter represented as SVS(w), where w denotes any integer from 0 to 77. The 1150×78 servo sectors SVS(0)–SVS(77) of track TR(0)–TR(1149) are radially arranged around disk surface DS(x) of magnetic disk DI.

Figure 4:
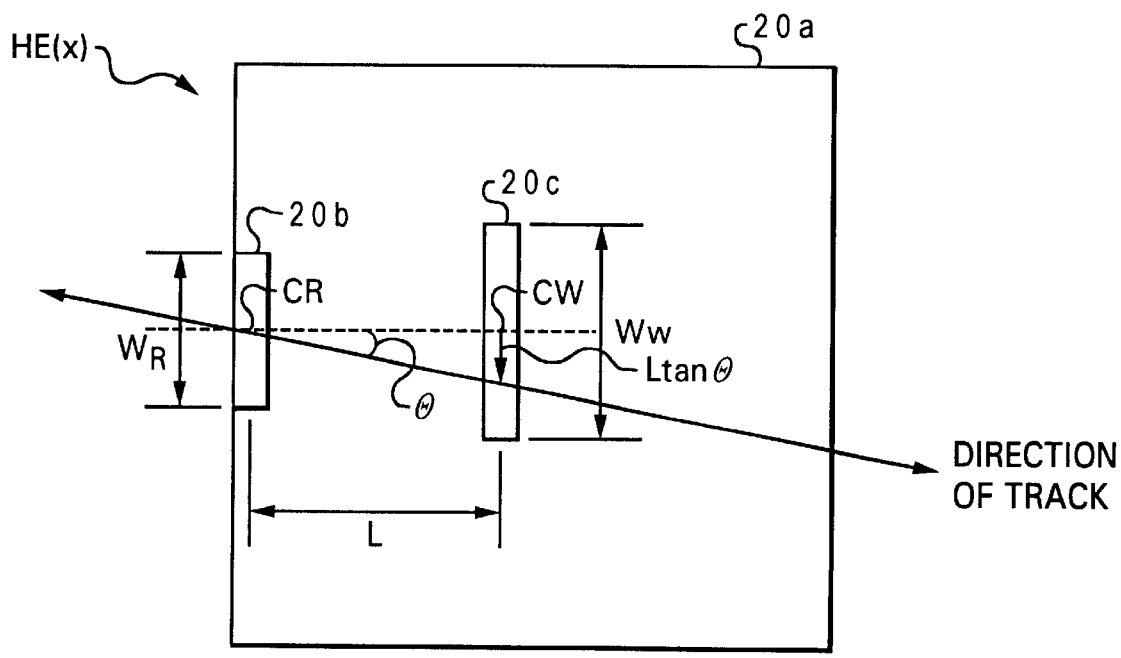
FIG. 4 illustrates a configuration of a magnetic head in the disk apparatus in accordance with a preferred embodiment of the present invention.

Referring now to FIG. 4, there is depicted a block diagram of the construction of head HE(x). Head HE(x) has a slider 20a which is provided with a read element including a read gap 20b for reading data and a magnetoresistive element and a write element including a write gap 20c for writing data. Head HE(x) is kept levitated from rotating disk surface DS(x) with a clearance, for example, of 0.1 to 0.2 μm. A longitudinal dimension $W_R$ of read gap 20b is smaller than a longitudinal dimension $W_W$ of write gap 20c. There is a distance L between center positions of read gap 20b and write gap 20c.

The read element of head HE(x) reads data recorded in an accessed track TR(y) (the track TR(y) immediately below read gap 20b) and outputs a read signal to amplifier 6 of FIG. 1. The write element of head HE(x) writes data into a data sector DTS of an accessed track TR(y) (the track TR(y) immediately below write gap 20c), according to a write data signal supplied from amplifier 6. The angle θ between a position at a longitudinal center CR of read gap 20b to a longitudinal center CW of write gap 20c and a direction of the track (i.e. a direction in which the magnetic disk DI rotates) varies with a position of an accessed track TR(y). When head HE(x) accesses track TR(y), there is a difference of Lxtan θ between the position of center CR of read gap 20*b* and the position of center CW of write gap 20*c* in the direction of the width of track TR(y).

With reference to FIGS. 1 and 4, according to the driving current supplied from VCM driver 5, VCM 3 drives carriage 2, swings arm AR(x), and positions slider 20*a* of head HE(x) mounted on arm AR(x) over the target track TR(y). In particular, when VCM 3 swings AR(x), all arms AR(x) swing together. In addition, when slider 20*a* of head HE(x) is positioned, all sliders 20*a* of all heads HE(x) are positioned together.

Figure 5:
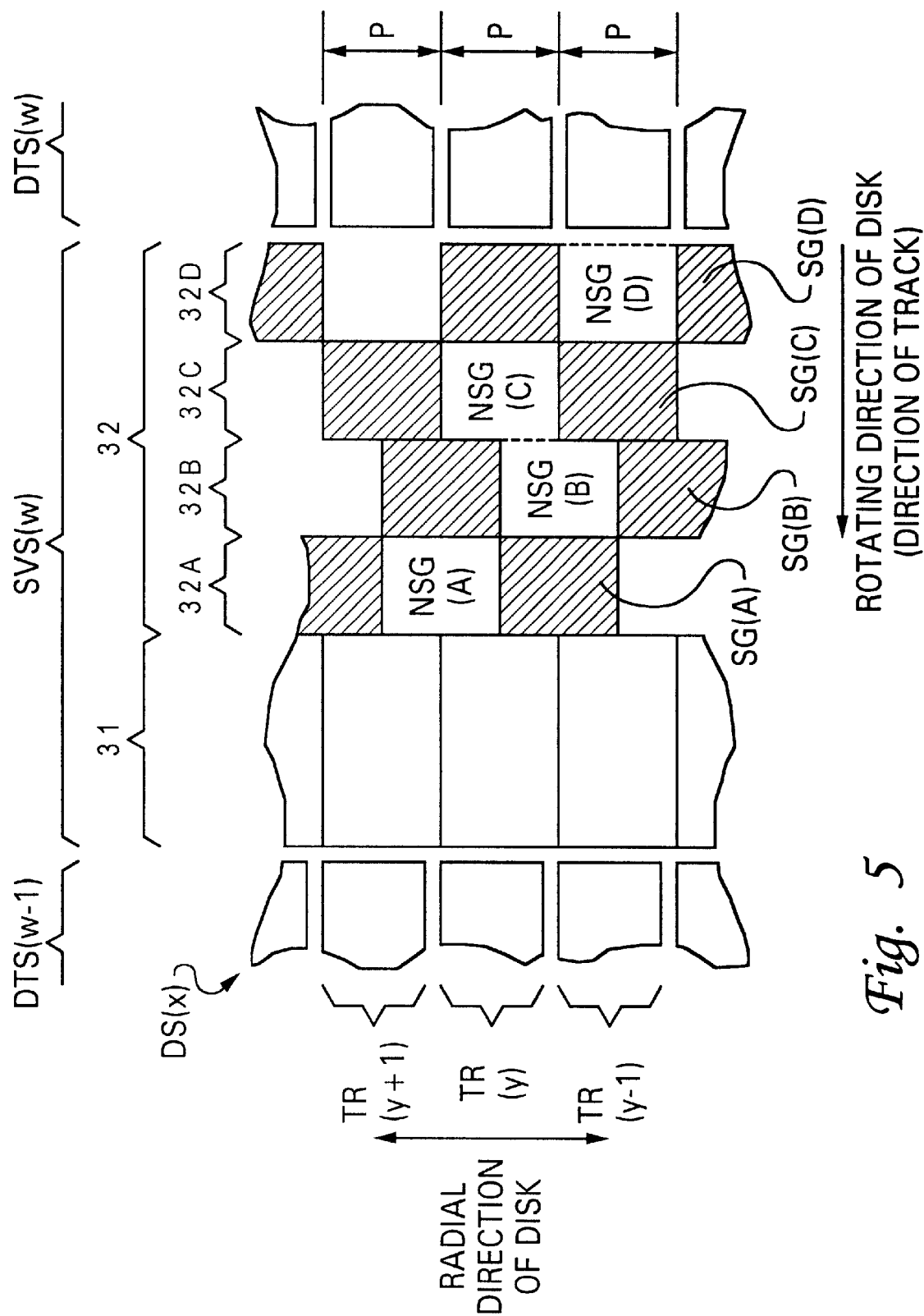
FIG. 5 depicts an enlarged view showing a part of the disk surface in the disk apparatus in accordance with a preferred embodiment of the present invention.

Referring now to FIG. 5, there is illustrated a magnified sectional view of a disk surface. A section of servo sectors SVS(w) of tracks TR(y−1), TR(y), and TR(y+1) are depicted within DS(x). In addition, data sectors DTS(w−1) preceding servo sectors SVS(w) and data sectors DTS(w) corresponding to servo sectors SVS(w) are illustrated. Tracks TR(y−1), TR(y), and TR(y+1) are positioned on disk surface DS(x) with a pitch (or width) of P.

Servo sector SVS(w) includes an identification information area 31 and a burst pattern area 32. The burst pattern area 32 contains burst pattern arrays 32A, 32B, 32C, and 32D arranged along the radial direction of the disk. In each burst pattern array, signal areas SG in which a signal is recorded and no-signal areas NSG in which no signal is recorded are alternately disposed. Two adjacent burst pattern arrays 32A and 32B form a main burst pattern. The other adjacent burst pattern arrays 32C and 32D form a slave burst pattern. The dimension of signal area SG and no-signal area NSG in the radial direction of the disk equals track width P. Dimension $W_R$ of read gap 20*a* (see FIG. 4) of head HE(x) that reads burst pattern arrays 32A, 32B, 32C, and 32D, however, is smaller than track width P.

Signal areas SG(A) in burst pattern array 32A and signal areas SG(B) in burst pattern array 32B are disposed in a staggered format along the radial direction of the disk. The boundaries between signal areas SG(A) and no-signal areas NSG(A) in burst pattern array 32A and the boundaries between signal areas SG(B) and no-signal areas NSG(B) in burst pattern array 32B are on the transverse centers of tracks TR. Signal areas SG(C) in burst pattern array 32C and signal areas SG(D) in burst pattern array 32D are disposed in a staggered format along the radial direction of the disk. The boundaries between signal areas SG(C) and no-signal areas NSG(C) in burst pattern array 32C and the boundaries between signal areas SG(D) and no-signal areas NSG(D) in burst pattern array 32D are on the boundaries of tracks TR.

At the beginning of identification information area 31, a servo sector start code is recorded. In identification information area 31 of servo sector SVS(w) of track TR(y), a Gray code (cyclic binary code) representing the track identification number y of track TR(y), a code representing the physical sector identification number w of servo sector SVS(w), and the like are recorded.

With reference again to FIG. 1, amplifier 6 amplifies the read signal supplied from head HE(x) with a predetermined gain and outputs the amplified read signal to R/W channel module 7 and HDC 8. At a data read, according to data from HDC 8, amplifier 6 selects a head HE(x) to be controlled out of the read signals supplied from heads HE(0)–HE(9). Amplifier 6 then amplifies the read signal supplied from selected head HE(x). At a data write, amplifier 6 amplifies the write data signal supplied from R/W channel 7*b* and outputs the amplified signal to selected head HE(x).

R/W channel module 7 shapes the waveform of the read signal supplied from amplifier 6 and outputs the shaped signal to ADC 7*a* and R/W channel 7*b*. ADC 7*a* extracts a code-area signal from the shaped analog read signal, converts the code-area signal into digital data, and outputs the digital data to HDC 8. ADC 7*a* also extracts the signals of burst pattern arrays 32A, 32B, 32C, and 32D from the shaped read signal, converts these burst pattern array signals to digital values AD, BD, CD, and DD respectively, and outputs the digital values to HDC 8. The timing of the code-area signal and burst pattern array signal extractions is controlled by HDC 8.

At a data read, R/W channel 7*b* extracts a data-area signal from the shaped read signal and generates digital read data according to the extracted signal. At a data write, R/W channel 7*b* generates an analog write data signal from the write data supplied from external equipment via MPU 11 and HDC 8 and outputs the generated signal to amplifier 6. The timing of outputting the write data signal is controlled by HDC 8.

MPU 11 has an interface to an external device and controls the input and output of commands and data which are output to or supplied from the external device. MPU 11 also controls HDC 8 according to the command supplied from the external device. For example, the identification number of head HE to be controlled, $x=t_x$, the identification number of target track TR, $y=t_y$, and the value $t_p$ indicating the target position in track TR($t_y$) are preferably supplied from the external device. When these prefered values are supplied, MPU 11 performs seek/follow control to position head HE($t_x$) to be controlled over target track TR($t_y$) of disk surface DS($t_x$) and to move head HE ($t_x$) to follow target position $t_p$ of track TR($t_y$). At the same time, MPU 11 also performs the data read/write for disk surface DS(x) and compensation of PES gain and CONT gain in the servo loop for controlling the position of head HE and the like. MPU 11 also performs computations for calculating a compensation value for the data supplied from HDC 8 in the compensation of PES gain and CONT gain.

Together with VCM 3, carriage 2, head HE, amplifier 6, ADC 7*a*, DAC 10*a*, and VCM driver 5, HDC 8 forms a servo loop for controlling the position of head HE(x) with respect to disk surface DS(x). HDC 8 outputs a digital drive control signal to DAC 10*a* for VCM driver 5 so that the head HE($t_x$) to be controlled follows target position $t_p$ in target track TR($t_y$)

Together with spindle motor 1, the sensor for detecting the rotation speed of spindle motor 1, DAC 10*b*, and spindle motor driver 4, HDC 8 forms a servo loop for controlling the rotation speed of disk DI. HDC 8 outputs a digital drive control signal to DAC 10*b* for spindle motor 4 so that the rotation speed of disk DI reaches the target rotation speed.

Memory 9 preferably contains a volatile memory such as a RAM and a rewritable nonvolatile memory such as an EEPROM. The volatile memory temporarily stores the identification number of head HE to be controlled, $x=t_x$, the identification number of target track TR, $y=t_y$, the target position $t_p$ in track TR($t_y$) and the like. The nonvolatile memory preferably stores a PES gain table, which is a table of PES gains H(0)–H(9) respectively applied to the servo loops of the head HE(0)–HE(9). Further, nonvolatile memory preferably stores a CONT gain table, which is a table of CONT gains K(0)–K(9) respectively applied to the servo loops of head HE(0)–HE(9). Both the PES gain table and CONT gain table are depicted in Table 1, and will be further described. Alternatively, memory 9 may comprise just volatile memories such as a RAM, and the tables mentioned above may be recorded in special areas reserved beforehand on disk surface DS and may be read from disk surface DS and written into the volatile memory of memory 9 when the disk apparatus is activated.

DAC 10a and DAC 10b separately convert input digital drive control signals into analog drive control signals and respectively output these drive control signals to VCM driver 5 and spindle motor driver 4. VCM driver 5 generates a driving current according to the drive control signal supplied from DAC 10a and applies the driving current to VCM 3. Spindle motor driver 4 generates a drive signal according to the drive control signal supplied from DAC 10b and applies the drive signal to spindle motor 1.

Figure 6:
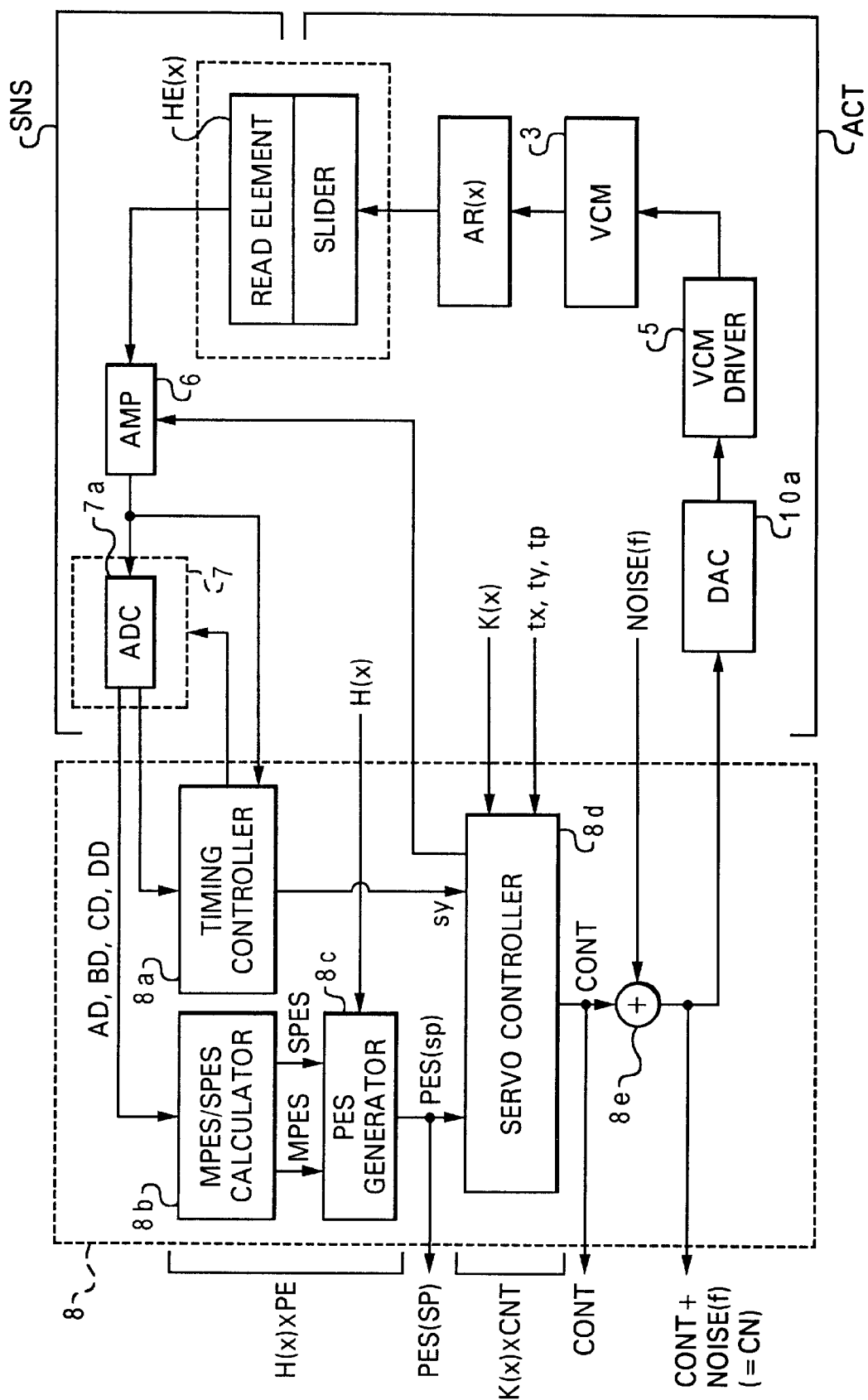
FIG. 6 illustrates a configuration of the servo loop for a magnetic head in the disk apparatus in accordance with a preferred embodiment of the present invention.

With reference now to FIG. 6, there is depicted a block diagram of a servo loop configuration for head HE(x). FIG. 6 will be utilized for describing the procedure for compensating PES gain H(x) and CONT gain K(x) in the servo loop. As depicted, HDC 8 includes a timing controller 8a, an MPES/SPES generator 8b, a PES generator 8c, a servo controller 8d, and a noise adder 8e.

As depicted in FIG. 6, DAC 10a converts the digital drive control signal CONT supplied from the HDC 8 into an analog drive control signal and outputs the analog drive control signal to VCM driver 5. VCM driver 5 generates a VCM driving current according to the analog drive control signal supplied from DAC 10a and outputs the VCM driving current to VCM 3. According to the VCM driving current, VCM 3 drives carriage 2 (see FIG. 1), swings arm AR(x), and moves slider 20a (see FIG. 4) of head HE(x), which is the load to be controlled.

The read element of head HE(x), which functions as a position sensor, reads data recorded in the corresponding track TR (the track immediately below read gap 20b) on disk surface DS(x) and outputs the read signal to amplifier 6. Amplifier 6 amplifies the input read signal with a predetermined gain and outputs the amplified read signal to R/W channel module 7 and timing controller 8a. R/W channel module 7 shapes the waveform of the amplified read signal and supplies the shaped read signal to ADC 7a. ADC 7a extracts the signal of identification information area 31 (see FIG. 5) from the shaped read signal, converts the signal into digital data, and outputs the digital data to timing controller 8a. ADC 7a also extracts the signals of burst pattern arrays 32A, 32B, 32C, and 32D (see FIG. 5) from the shaped read signal, converts these signals respectively into the digital values AD, BD, CD, and DD, and outputs the digital values to MPES/SPES calculator 8b.

In HDC 8, timing controller 8a detects a servo sector start code from the amplified read signal and, according to the detection timing, outputs to R/W channel module 7 a timing signal. The timing signal controls the extraction of the signal of identification information area 31 and signals of burst pattern arrays 32A, 32B, 32C, and 32D included in the read signal or the signal of the data sector DTS. The operation timing of HDC 8 is also controlled according to the servo sector start code detection timing. From the digital data of identification information area 31 supplied from ADC 7a, the track identification number, $y=s_y$, is detected, and the detected track identification number $s_y$ is output to servo controller 8d.

MPES/SPES generator 8b calculates the main position detecting signal (or main positioning error signal: MPES) from digital value AD of burst pattern array 32A, digital value BD of burst pattern array 32B, and PES gain H(x). In particular, MPES may be calculated according to equations (1a) and (1b).

$$MPES=((AD-BD)/(AD+BD))\times H(x) \quad (1a)$$

$$=MD\times H(x) \quad (1b)$$

where $$MD=(AD-BD)/(AD+BD)$$

MPES/SPES generator 8b also calculates the slave position detecting signal (or slave positioning error signal: SPES) from digital value CD of burst pattern array 32C, digital value DD of burst pattern array 32D, and PES gain H(x). In particular, SPES may be calculated according to equations (2a) and (2b).

$$SPES=((CD-DD)/(CD+DD))\times H(x) \quad (2a)$$

$$=SD\times H(x) \quad (2b)$$

where $$SD=(CD-DD)/(CD+DD)$$

PES gain H is established for each head HE, and the above-mentioned H(x) denotes the PES gain applied to head HE(x). PES gain H(x) is read from the PES gain table in memory 9 and supplied to MPES/SPES generator 8b. In the PES gain table, PES gains H(0), H(1), . . . , H(9) for the head HE(0)–HE(9) are specified, as depicted in Table 1.

Digital values AD, BD, CD, and DD mentioned above vary with the position of read gap center CR (see FIG. 4) of head HE(x) on track TR(y) having a track width P (see FIG. 5), in the direction of the track width (in a radial direction of the disk). If read gap center CR is disposed on the boundary between track TR(y−1) and track TR(y) as depicted in FIG. 5, digital value AD reaches the maximum value DM, and digital value BD reaches the minimum value 0. Because read gap dimension $W_R$ (see FIG. 4) is smaller than the dimension (=P) of signal area SG (see FIG. 5) in a radial direction of the disk, digital value AD reaches the maximum value DM and digital value BD reaches the minimum value 0 when read gap center CR is disposed in the vicinity of the boundary mentioned above. If read gap center CR is disposed on a boundary of track TR, digital values CD and DD are given by CD=DD=DM/2. Likewise, if read gap center CR is disposed in the transverse center of track TR(y), digital values AD and BD are given by AD=BD=DM/2. If read gap center CR is disposed in the vicinity of the transverse center of track TR(y), digital value CD reaches the minimum value 0 and digital value DD reaches the maximum value DM.

Accordingly, digital value MD is 0 when read gap center CR is disposed in the transverse center of track TR, and is maximum value 1 or minimum value −1 when read gap center CR is in the vicinity of a boundary of track TR. Further, digital value SD is 0 when read gap center CR is disposed on a boundary of track TR, and is maximum value 1 or minimum value −1 when read gap center CR is in the vicinity of the transverse center of track TR. When digital values MD and SD are considered to be position variables of head HE(x), PES gain H(x) is the inclination of the MPES and the SPES.

PES generator 8c selects the MPES or the SPES according to the target position in target track $TR(t_y)$ and outputs the MPES or the SPES as the PES to servo controller 8d. The MPES linearly varies when the displacement of read gap center CR is in the vicinity of the transverse center of track TR, and becomes nonlinear when the displacement of read gap center CR is in the vicinity of a boundary of track TR. On the contrary, the SPES linearly varies when the displacement of read gap center CR is in the vicinity of a boundary of track TR, and becomes nonlinear when the displacement of read gap center CR is in the vicinity of the transverse center of track TR.

In head HE(x), there is a difference of L×tan θ between read gap center CR and write gap center CW, as illustrated in FIG. 4. At a data write, for instance, a value corresponding to the transverse center of track TR is input as target position $t_p$, read gap 20b is moved to follow the transverse center of track TR, and write gap 20c is moved to follow a position deviating from the transverse center of track TR, into which data is written, by L×tan θ as mentioned above. At a data read, a value corresponding to a position deviating from the transverse center of track TR by L×tan θ as described above, is input as target position $t_p$, and read gap 20b is moved to follow the target position, from which data is read.

Therefore, if target position $t_p$ is within a range of ±P/4 (P denotes the track width) from the transverse center of track TR, for instance, the MPES is selected as the PES. If target position $t_p$ is beyond the range of ±P/4 from the same transverse center, the SPES is selected as the PES.

When the identification number, $x=t_x$, of the head HE to be controlled, the identification number, $y=t_y$, of the track to be accessed, and the target position $t_p$ in track $TR(t_y)$ are supplied from MPU 11, then servo controller 8d positions head $HE(t_x)$ over track $TR(t_y)$ and generates the drive control signal CONT so that read gap 20b of head $HE(t_x)$ follows target position $t_p$ in track $TR(t_y)$, and outputs the drive control signal CONT to DAC 10a.

First, servo controller 8d generates data EY corresponding to a difference of the track identification number $s_y$ detected by head HE ($t_x$) from target track identification number $t_y$, and calculates drive control signal CONT from an equation (3), utilizing the CONT gain $K(t_x)$.

$$CONT=K(t_x)\times EY \quad (3)$$

Then, servo controller 8d outputs drive control signal CONT to DAC 10a, and detected track identification number $s_y$ is set to target track identification number $t_y$, so that head HE ($t_x$) is positioned over track $TR(t_y)$ Next, servo controller 8d generates data EP corresponding to a difference of sense position $s_p$ of head $HE(t_x)$, which is a PES value generated by head $HE(t_x)$, PES generator 8c, and the like, from target position $t_p$, and calculates drive control signal CONT from an equation (4) utilizing the CONT gain $K(t_x)$.

$$CONT=K(t_x)\times EP \quad (4)$$

Then, servo controller 8d outputs the digital drive control data CONT to DAC 10a, and sense position (PES value) $s_p$ is set to target position $t_p$, so that head $HE(t_x)$ follows the target offset position in track $TR(t_y)$ Sense position $s_p$ is the position of read gap 20b in track $TR(t_y)$.

CONT gain K of each head HE is set separately. The above mentioned $K(t_x)$ is the CONT gain applied to head $HE(t_x)$. CONT gain $K(t_x)$ is read from the CONT gain table in memory 9 and supplied to servo controller 8d. The CONT gain table contains CONT gains K(0), K(1), . . . , K(9) for the head HE(0)–HE(9), as illustrated in Table 1.

When the PES gain and the CONT gain are compensated, noise adder 8e adds a noise signal NOISE(f), which is a single-frequency signal of a frequency f, to drive control signal CONT supplied from servo controller 8d and outputs the result to DAC 10a. The digital value of noise signal NOISE(f) is successively read from the noise table in memory 9 and added to the drive control signal CONT at time intervals $T_s$. When the compensation is not performed, drive control signal CONT supplied from servo controller 8d is directly output to DAC 10a.

By the present invention, it is preferable to set the transfer function from DAC 10a to slider 20c (see FIG. 4) of head HE(x), which is the load to be controlled, to ACT(jω). In addition, it is preferable to set the transfer function from the read element of head HE(x) to ADC 7a to be SNS(jω), where $j=(-1)1/2$ and $8\omega=2\pi\times F$, in which F denotes a frequency. It is further preferable to set the transfer function from MPES/SPES generator 8b to PES generator 8c to be H(x)×PE(jω), using PES gain H(x). Moreover, it is preferable to set the transfer function of servo controller 10e to be K(x)×CNT(jω), using CONT gain K(x).

The open-loop transfer function GO(jω) of the servo loop depicted in FIG. 6 is provided by equations (5a) and (5b).

$$GO(j\omega)=F(j\omega)\times B(j\omega) \quad (5a)$$

$$=(H(x)\times K(x))\times(CNT(j\omega)\times ACT(j\omega)\times SNS(j\omega)\times PE(j\omega)) \quad (5b)$$

where $$F(j\omega)=K(x)\times(CNT(j\omega)\times ACT(j\omega))$$

$$B(j\omega)=H(x)\times(SNS(j\omega)\times PE(j\omega))$$

The closed-loop transfer function GC(jω) of the servo loop shown in FIG. 6 is calculated by an equation (6).

$$GC(j\omega)=F(j\omega)/(1+F(j\omega)\times B(j\omega)) \quad (6)$$

When the open-loop transfer function GO(jω) mentioned above is expressed as GO(jω)=jU+V (U and V are constants), the magnitude of the open-loop transfer function GO(jω), or an open-loop gain GO(x) provided by an equation (7).

$$GO(x)=(U\times U+V\times V)^{1/2} \quad (7)$$

Letting the frequency-f component of the digital drive control signal CONT input to noise adder 8e be CONT(f), the signal output from noise adder 8e when NOISE(f) is input to noise adder 8e be CN (=CONT+NOISE(f)), the frequency-f component of CN be CN(f), the magnitude of CONT(f) be MAG[CONT(f)], and the magnitude of CN(f) be MAG[CN(f)], the open-loop gain GO(x) mentioned above is calculated according to an equation (8). Further, because CN(f)=CONT(f)+NOISE(f), the open-loop gain GO(x) can be calculated according to an equation (9).

$$GO(x)=MAG(CONT(f))/MAG(CN(f)) \quad (8)$$

$$GO(x)=MAG(CONT(f))/MAG(CONT(f)+NOISE(f)) \quad (9)$$

Figure 7:
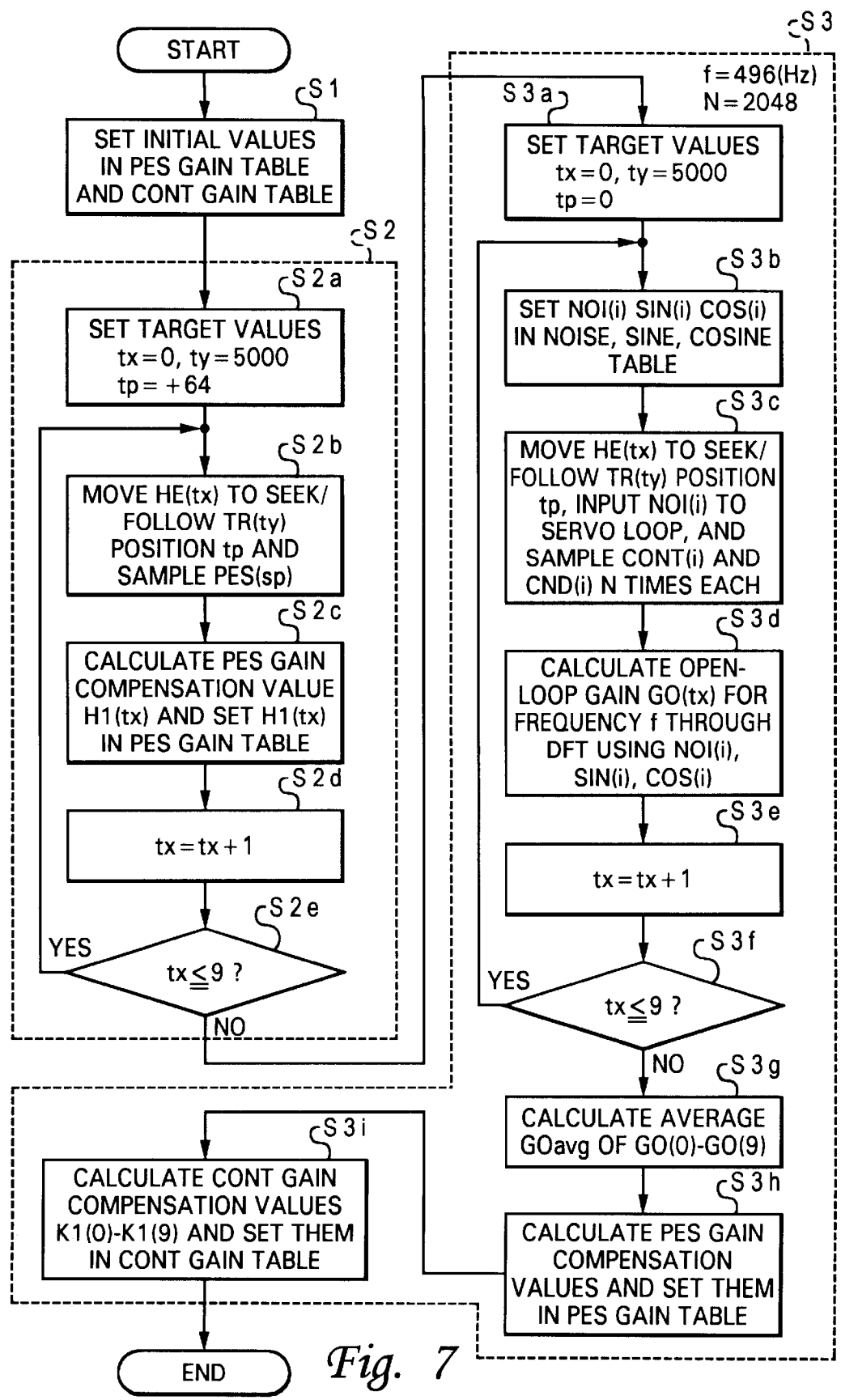
FIG. 7 depicts a high-level logic flowchart illustrating a procedure for compensating the PES gain and the CONT gain K in the disk apparatus in accordance with a preferred embodiment of the present invention.

Referring now to FIG. 7, there is illustrated a high level logic flowchart depicting a process for compensating the PES gain H and the CONT gain K in the disk apparatus according to the embodiment of the present invention. In summary, in the compensation procedure illustrated, the first PES gain H1 for improving the linkage between MPES and SPES or thereabout is first calculated separately for each head HE in the same manner as the conventional method. Next, the open-loop gain of the servo loop when the first PES gain H1 is utiized is measured and calculated in order to eliminate the variability of the PES at the center of the track or thereabout. According to the open-loop gain, the first PES gain H1 is compensated, and the second PES gain H2 is generated for each head HE, and the CONT gain K of each head HE is compensated.

In particular, as depicted, the process starts at block 70 and thereafter proceeds to block S1. Block S1 depicts setting the initial value $H_0$ for all PES gains $H(0)$–$H(9)$ in the PES gain table and setting the initial value $K_0$ for all CONT gains $K(0)$–$K(9)$ in the CONT gain table.

In the explanation below, letting a transverse position in track TR(y) be 8-bit data, the center of a track is set as 0 (0(hex)) and boundary positions in track TR(y) on the side of track TR($t_y$+1) and on the side of track TR(y-1) are respectively set as +127 (7F(hex)) and -127 (80(hex)). Accordingly, PES is any integer within the range of -127 to +127 (from 0(hex) to 80(hex)). Letting the digital drive control signal CONT be 16-bit data, the center value of the digital control signal CONT is set as 0 (0(hex)), the minimum value is set as -32767 (8000(hex)), and the maximum value is as +32767 (7FFF(hex)).

In the example, let PES gain H(x) be 8-bit data, where H(x)=0 corresponds to 0(hex), and let H(x)=2.0 correspond to 80(hex). The initial value $H_0$ of the PES gain is set as 1.0 (40(hex)), for instance. Let the CONT gain K(0) be 16-bit data, where K(x)=0 corresponds to 0(hex) and K(x)=2.0 corresponds to 8000(hex). The initial value $K_0$ of the CONT gain is set to 1.0 (4000(hex)), for instance.

Next, in block S2, including blocks S2a–S2e, the first PES gains $H_1(0)$–$H_1(9)$ are calculated. Block 2a illustates setting identification number $t_x$ of the head HE to be controlled to 0, setting identification number $t_y$ of the target track to 5000, and setting target position $t_p$ to +64. The target of track TR(5000) is disposed at the approximate center between radially innermost track TR(0) and radially outermost track TR(11499) on disk surface DS(x). The target position, $t_p$=+64, is a position in track TR(5000) deviating from the transverse center by P/4 (P is the track width) to the side of track TR(5001).

Block S2b depicts moving head HE(0) to seek/follow target position, $t_p$=+64, in track TR(5000), and sampling, as the sense position $s_p$, a specified number of MPES values calculated according to expression 1a.

Block S2c illustrates calculating the average $MPES_{avg}(0)$ of sampled the MPES values and calculating the first PES gain $H_1(0)$ utilizing the $MPES_{avg}(0)$. That is, the first PES gain $H_1(0)$ is calculated according to equations (10a) and (10b), so that $MPES_{avg}(0)$ becomes +64(40(hex)) when head HE(0) follows the position of +64(40(hex)) in the track TR(5000), where $H_0$=1.0.

$$H_1(t_x)=H_0\times(+64/MPES_{avg}(t_x)) \quad (10a)$$

$$=+64/MPES_{avg}(t_x) \quad (10b)$$

The first PES gain $H_1(0)$ is placed in the H(0) area (address) of the PES gain table. Thereafter, the process passes to block S2d.

Block S2d depicts incrementing the identification number $t_x$ of the head HE to be controlled. Next, the process proceeds the block S2e. Block S2e illustrates a determination as to whether or not $t_x$t is less than or equal to 9. If $t_x$t is less than or equal to 9, the process passes back to block S2b. Blocks S2b through S2d are repeated in the same manner as previously described to calculate the first PES gain compensation values $H_1(2)$–$H_1(9)$ and place the values in the PES gain table. When $t_x$ exceeds 9 at block S2e, after the compensation values H(0)–H(9) are placed in the PES gain table, the process proceeds to block S3.

In block S3, including blocks S3a–S3i, the open-loop gain for frequency f of the servo loop in FIG. 6 is calculated, and the second PES gains $H_2(0)$–$H_2(9)$ and the CONT gains $K_1(0)$–$K_1(9)$ are calculated utilizing the open-loop gain. In summary, during block S3, the open-loop gain for frequency f is obtained by supplying a noise signal NOISE(f) of a frequency f from noise adder 8e to the servo loop, sampling the digital drive control signal CONT supplied from servo controller 8d to noise adder 8e and signal CN (=CONT+ NOISE(f)) output from noise adder 8e N times each at $T_s$ sampling time intervals, and applying the sampled data to discrete Fourier transform (DFT).

For the example given, the servo loop in FIG. 6 is designed so that the open-loop gain for a frequency of 500.0 Hz is 1.0. Sampling time interval $T_s$ must match the time interval at which head HE reads the servo sector. The read time interval is determined by the number of the servo sectors in track TR(y) and the rotation speed of disk DI. For the example depicted, the read time interval is 105.6 μsec in the disk apparatus illustrated in FIG. 1. Accordingly, $T_2$ equals 105.6 μsec. The frequency f mentioned above is set to such a value closest to 500.0 Hz that $1/(f\times T_s)$ is close to a smallest possible integer. In this example, f is set to 496.0 Hz. The sampling count N is set to 2048. While 2048 CONT values and 2048 CN values are sampled, the head HE($t_x$) reads the servo sectors SVS of the track TR($t_y$) 2048 times in total. Since the track TR($t_y$) has 78 servo sectors, the the disk DI makes about 26 revolutions during the sampling period.

In particular to block S3, block S3a depicts setting identification number $t_x$ of the head HE to be controlled to 0, setting identification number $t_y$ of target track TR to 5000, and setting target offset amount (target position) $t_p$ to 0. Target position, $t_p$=0, is the transverse center in the track TR(5000) and corresponds to the center of the MPES. The PES gain table contains the first PES gains $H_1(0)$–$H_1(9)$ obtained in block S2. The CONT gain table contains the initial value, $K_0$=1.0 (4000(hex)), set in block S1.

Next, step S3b illustrates setting NOI(i), SIN(i), and COS(i) respectively in the noise table, sine table, and cosine table provided in memory. Table 2 depicts the contents of a noise table, sine table, and cosine table, according to the method and system of the present invention.

In particular, NOI(i) is an instantaneous data array of the noise signal NOISE(f) and is provided according to equations (11a) and (11b). For the present example, i is a variable incremented by one from 0 to N-1, f is 496 Hz, the sampling count N is 2048, and the sampling time interval $T_s$ is 105.6 μsec.

$$NOI(i)=2.0\times\sin(2\pi\times f\times T_s\times i) \quad (11a)$$

$$=2.0\times\sin(2\pi\times(T_s\times i)/(T_s\times 19)) \quad (11b)$$

Because $f\times T_s\times i=(T_s\times i)/(T_s/(f\times T_s))$ and $1/(f\times T_s)=19.092$, the NOI(i) cycle is about $19\times T_s$. Accordingly, the noise table contains the data of one cycle, which is NOI(0)–NOI(18), as shown in Table 2, and NOI(0) of the noise table is used for NOI(19), for instance.

The instantaneous data arrays NOI(0), NOI(1), . . . , NOI(N-1) of NOISE(f) are read from the noise table and supplied from noise adder 8e to the servo loop at time intervals $T_s$. Letting N sampled data items of the drive control signal CONT be CONT(0), CONT(1), ..., CONT (N-1) and N sampled data items of the signal CN be CND(0), CND(1), . . . , CND(N-1), the sampled data items CONT(i) and CND(i) are data sampled when the noise signal NOI(i) is input to the servo loop. The noise signal NOI(i) is also used to calculate the open-loop gain according to the DFT.

The data items SIN(i) and COS(i) form instantaneous data arrays, of the sine function and cosine function respectively, of the frequency f used to calculate the open-loop gain by the DFT and are defined according to equations (12a), (12b), (13a), and (13b).

$$SIN(i)=255 \times \sin(2\pi \times f \times T_s \times i) \quad (12a)$$

$$=255 \times \sin(2\pi \times (T_s \times i)/(T_s \times 19)) \quad (12b)$$

$$COS(i)=255 \times \cos(2\pi \times f \times T_s \times i) \quad (13a)$$

$$=255 \times \cos(2\pi \times (T_s \times i)/(T_s \times 19)) \quad (13b)$$

The sine table contains the data items SIN(0)–SIN(18). The cosine table contains the data items COS(0)–COS(18). The amplitude of the sine function and cosine function of the frequency f according to the data items SIN(i) and COS(i) ranges from −255(FF00(hex)) to +255(00FF(hex)).

Next, block S3*b* illustrates moving head HE(0) to seek/follow the target position, $t_p=0$, in the track TR(5000), and supplying noise signals NOI(0)–NOI(N−1) to the servo loop at intervals $T_s(=105.6~\mu\text{sec})$, and sampling drive control signals CONT(0)–CONT(N−1) and signals CND(0)–CND(N−1) at intervals $T_s$.

Next, block S3*d* depicts calculating the open-loop gain for head HE(0). The frequency-f (=496 Hz) component CONT (f) included in the digital drive control signal CONT output from the servo controller can be calculated from an equation (14), according to the definition of the DFT.

$$CONT(f)=SUM(CONT(i) \times (j \times SIN(i) + COS(i))) \times (2/N) \quad (14)$$

$$=(j \times A + B) \times (2/N)$$

where $$A=SUM(CONT(i) \times SIN(i))$$

$$B=SUM(CONT(i) \times COS(i))$$

Letting a discrete function of an integral variable i be P(i), where $0 \leq i \leq (N-1)$, SUM(P(i)) is expressed as follows:

$$SUM(P(i))=P(0)+P(1)+\ldots+P(N-1)$$

Likewise, the frequency-f component CN(f) included in the signal CN output from the noise adder 8*e* can be calculated from equation (15a), (15b) and (15c), according to the definition of the DFT.

$$CN(f)=SUM(CND(i) \times (j \times SIN(i) + COS(i))) \times (2/N) \quad (15a)$$

$$=SUM((CONT(i)+NOI(i)) \times (j \times SIN(i) + COS(i))) \times (2/N) \quad (15b)$$

$$=(j \times C + D) \times (2/N) \quad (15c)$$

where $$C=SUM(CN(i) \times SIN(i))$$

$$D=SUM(CN(i) \times COS(i))$$

Therefore, the magnitude MAG(CONT(f)) of CONT(f) can be calculated from an equation (16).

$$MAG(CONT(f))=(2/N) \times (A \times A + B \times B)^{1/2} \quad (16)$$

Further, the magnitude MAG(CN(f)) of CN(f), where CN(f)=CONT(f)+NOISE(f), can be calculated according to an equation (17).

$$MAG(CN(f))=(2/N) \times (C \times C + D \times D)^{1/2}. \quad (17)$$

Accordingly, the open-loop gain GO(0) of head HE(0) can be obtained from an equation (18).

$$GO(t_x)=MAG(CONT(f))/MAG(CN(f))$$

$$=((A \times A + B \times B)/(C \times C + D \times D))^{1/2} \quad (18)$$

Thereafter, block S3*e* depicts incrementing the identification number $t_x$ of the head HE to be controlled. Next, the process passes to block S3*f*. Block S3*f* illustrates a determination as to whether or not $t_x$ is less than or equal to 9. If $t_x$ is less than or equal to 9, the process passes to block S3*c*. In the same way, while the steps S3*c*–S3*e* are repeated, the open-loop gains GO(1)–GO(9) for the head HE(1)–HE(9) are calculated. When the identification number $t_x$ exceeds 9 in block S3*f*, the process proceeds to block S3*g*.

Block S3*g* depicts calculating the average $GO_{avg}$ of the open-loop gains GO(0), GO(1), . . . , GO(9). By letting the sum of GO(0)–GO(9) be SUM(GO), the maximum value be MAX(GO), the minimum value be MIN(GO), and the number be MUM(GO) (=10), the average $GO_{avg}$ is calculated from an equation (19).

$$GO_{avg}=(SUM(GO)-MAX(GO)-MIN(GO))/(MUM(GO)-2) \quad (19)$$

By excluding the minimum value and maximum value from the calculation of the average $GO_{avg}$, as depicted in equation (19), the average of the open-loop gains GO(0)–GO(9) can be calculated excluding peculiar values, if any.

Next, block S3*h* illustrates calculating the second PES gains $H_2(\mathbf{0})$–$H_2(\mathbf{9})$ for head HE(0)–HE(9) respectively utilizing an equation (20).

$$H_2(t_x)=H_1(t_x) \times GO_{avg}/GO(t_x) \quad (20)$$

These second PES gains $H_2(\mathbf{0})$–$H_2(\mathbf{9})$ are placed in the PES gain table. If $GO_{avg}/GO(t_x)$ falls below a predetermined lower limit, $H_2(t_x)$ is calculated assuming that $GO_{avg}/GO(t_x)$ equals the predetermined lower limit in expression 20. In this example, the lower limit is predetermined as 0.8, and if $GO_{avg}/GO(t_x)$ is lower than 0.8, $H_2(t_x)$ is calculated assuming that $GO_{avg}/GO(t_x)$ equals 0.8. If $GO_{avg}/GO(t_x)$ exceeds a predetermined upper limit, $H_2(t_x)$ is calculated assuming that $GO_{avg}/GO(t_x)$ equals the predetermined upper limit. In this example, the upper limit is predetermined as 1.0, and if $GO_{avg}/GO(t_x)$ is greater than 1.0, $H_2(t_x)$ is calculated assuming that $GO_{avg}/GO(t_x)$ equals 1.0. $GO_{avg}$ in expression (20) corresponds to the first predetermined value.

Figure 8:
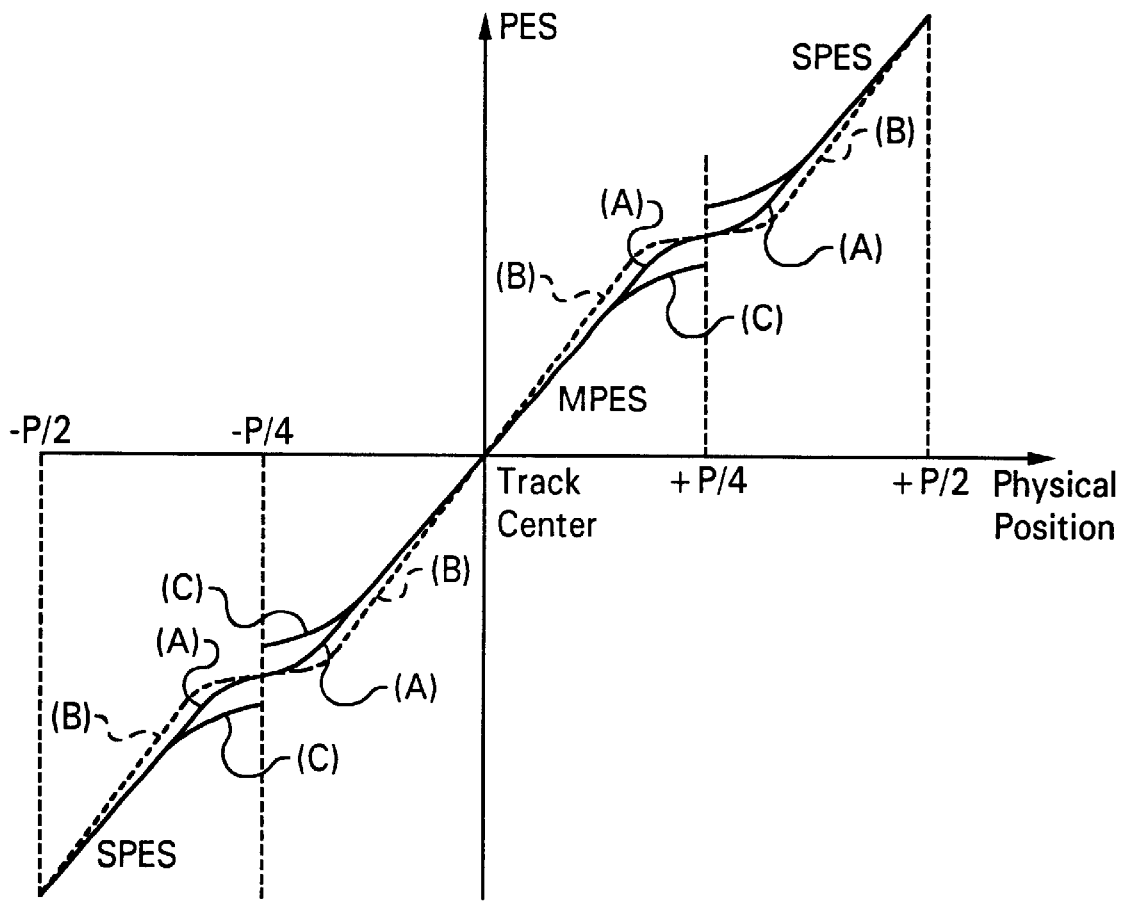
FIG. 8 illustrates PES values corresponding to physical positions of the head in a track.

With reference now to FIG. 8, there is depicted a graphical chart illustration according to the method and system of the present invention. The PES generated using the second PES gain $H_2(t_x)$ is depicted as a line (A). The PES is different from that generated using the first PES gain $H_1(t_x)$ (illustrated as a line (B)) in that the inclinations at the centers of the MPES and the SPES corresponding to the transverse center of the track TR and the boundary of the track TR will not increase. The standard PES indicated as the line (A) is held, irrespective of the head HE (except in the vicinity of the linkage between the MPES and the SPES). Accordingly, by utilizing the second PES gain $H_2(t_x)$ to generate the PES, the servo stability can be improved. Head $HE(t_x)$ can exactly follow any target position except the linkage between the MPES and the SPES.

Returning now to FIG. 7, block S3*i* depicts calculating the compensation values $K_1(\mathbf{0})$–$K_1(\mathbf{9})$ for the CONT gains K(0)–K(9) utilizing an equation (21), where $K_0=1.0$.

$$K_1(t_x)=K_0 \times (1.2 \times GO_{avg})/GO(t_x) \quad (21)$$

The compensation values $K_1(\mathbf{0})$–$K_1(\mathbf{9})$ are placed in the CONT gain table. If $K_1(t_x)$ exceeds a predetermined upper limit, $K_1(t_x)$ is set to the predetermined upper limit. In this example, the upper limit is predetermined as 1.0, and if $K_1(t_x)$ exceeds 1.0, $K_1(t_x)=1.0$ (=$K_0$). If $K_1(t_x)$ is smaller than a predetermined lower limit, $K_1(t_x)$ is set to the predetermined lower limit. In this example, the lower limit is predetermined as 0.8, and if $K_1(t_x)$ is smaller than 0.8, $K_1(t_x)=0.8$. Accordingly, the processing at block S3i compensates the CONT gain for the servo loop with a large open-loop gain so that the open-loop gain is decreased. This can further reduce the variability in the servo loop, thus further improving the servo stability. The value of 1.2× $GO_{avg}$ in equation (21) corresponds to the second predetermined value.

According to the embodiment of the present invention, the open-loop gain of the servo loop for each head HE is obtained, the PES gain of each head HE is compensated according to the calculated open-loop gain, that is, the PES gain (inclination of the PES) is compensated according to the difference of each of the calculated open-loop gains from the standard value (average of calculated open-loop gains is used here), and the CONT gain of the servo loop with a large open-loop gain is also compensated, so that the inclination of the PES can be kept almost constant for any head HE, and the variability in the open-loop gain can be reduced. Therefore, the servo loop stability can be improved.

If the second PES gain $H_2$ compensated according to the open-loop gain is applied to the overall area in the track TR, in the embodiment described above, the linkage between the MPES and the SPES may be discontinuous, as depicted in a discontinuous line (C) in FIG. 8. Usually, the target position for a data write is in the vicinity of the track center, and the target position for a data read is offset from the track center. In this case, the target position for a data write corresponds to the center of the MPES or thereabout, and the target position can be exactly followed.

In particular, when an MR head (a head equipped with a magnetoresistive element) is utilized, data not only in the vicinity of the track center but also in an area corresponding to the linkage between the MPES and the SPES and thereabout must be read at a data read. Even if the PES shown as the line (B) in FIG. 8 is utilized in this case, the target position is normally followed, and a data read can be performed normally. By selectively utilizing the first PES gain $H_1$ for optimally compensating the linkage between the MPES and the SPES and the second PES gain $H_2$ for optimally compensating the inclination of the PES according to the target position or by selectively utilizing the first PES gain $H_1$ at a data read and the second PES gain $H_2$ at a data write, the PES gain can be more optimally compensated.

In the embodiment described above, the average $GO_{avg}$ of open-loop gains excluding the minimum value and maximum value, which have been excluded to exclude peculiar values, is utilized as the first predetermined value for calculating the second PES gain $H_2$, and the second predetermined value for calculating the CONT gain $K_1$ is 1.2× $GO_{avg}$. If the number of the heads HE is small, for instance, the average of all calculated open-loop gains may be utilized to set the first predetermined value and the second predetermined value. Further, the average value of all disk apparatus products or a designed value (ideal value) may be utilized instead of the average value of each piece of the disk apparatus, in order to set the first predetermined value and the second predetermined value.

In the embodiment described above, each head HE seeks and follows the same track TR(5000), and the first PES gain $H_1$ and the second PES gain $H_2$ are generated for each head HE. The tracks TR(0)–TR(1149) of disk surface DS may be partitioned into a plurality of zones, and the first PES gain $H_1$ and second PES gain $H_2$ may be generated for each head HE and for each zone. Further, the CONT gain K of each head HE or each zone may be compensated.

Figure 9:
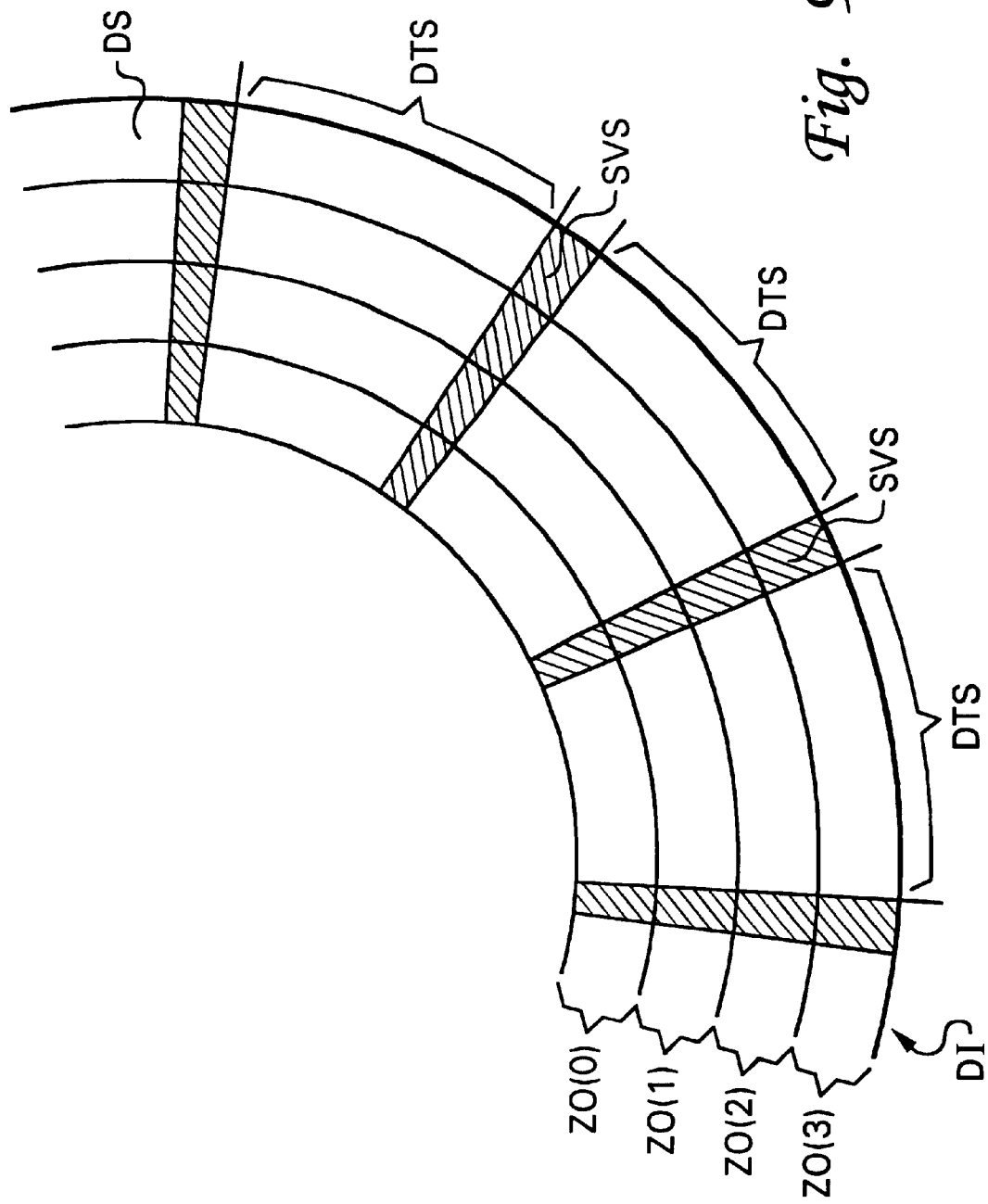
FIG. 9 depicts a configuration of a disk surface divided into multiple zones.

Referring now to FIG. 9, there is depicted a pictorial illustration of disk surface DS partitioned into multiple zones. In FIG. 9, 1150 tracks of the disk surface DS are divided into five zones ZO(0)–ZO(4). The structure of the corresponding PES gain table is illustrated in the attached Table 3.

In Table 3, H(x, z) (z denotes any integer from 1 to 4) denotes the PES gain which is utilized when the head HE(x) follows track TR in zone ZO(z) of disk surface DS(x).

While the invention has been particularly shown and described with reference to a preferred embodiment, it will be understood by those skilled in the art that various changes in form and detail may be made therein without departing from the spirit and scope of the invention.

For example, the compensation processing of the embodiment described above can be performed as needed, when the disk apparatus is manufactured and after the disk apparatus becomes a product, of course.

What is claimed is:

1. A method for compensating a head positioning servo within a storage device, wherein the servo is provided for causing a head to read a burst pattern arranged in a direction of a track width on a disk surface, said method comprising the steps of:

generating a position detecting signal indicating a head position according to the burst pattern read signal and a position detecting signal gain;

generating a drive control signal according to:
a difference between a value indicating a target position on the track and a value indicated by the position detecting signal and
a drive control signal gain;

moving the head according to the drive control signal to follow the target position;

calculating an open-loop gain of a head positioning servo when said head positioning servo causes said head to follow a predetermined position of a target track of a storage media surface by generating a first position detecting signal utilizing a first position detecting signal gain; and generating a second position detecting signal gain by compensating said first position detecting signal gain according to a difference between a first predetermined value, based on said first position detecting signal, and said open-loop gain of said head positioning servo.

2. The method for compensating a head positioning servo of claim 1, said method further comprising the steps of:

calculating a main position detecting signal and a slave position detecting signal on the basis of a burst pattern read signal and said position detecting signal gain, wherein said head positioning servo causes a head to read a burst pattern arranged in a direction of a track width on a storage media surface including a plurality of tracks to generate a burst pattern read signal;

selecting said main position detecting signal or said slave position detecting signal according to said head position in said track, wherein said selected signal is utilized as said position detecting signal; and compensating said position detecting signal gain so that a linkage between said main position detecting signal and said slave position detecting signal becomes continuous.

3. The method for compensating a head positioning servo of claim 1, wherein said step of calculating an open-loop gain of a head positioning servo, further comprises the steps of:
causing said head to follow said predetermined position in said target track utilizing said position detecting signal gain while supplying instantaneous data of a noise signal of a single frequency signal from an adding element provided in said head positioning servo to a servo loop at predetermined time intervals;

sampling a predetermined number of data items of a first signal added to said noise signal output from said adding element and a predetermined number of data items of a second signal supplied from said servo loop to said adding element at said predetermined time intervals;

calculating said open-loop gain of said head positioning servo on the basis of components of said single frequency signal included in said first signal and said second signal, said components of said single frequency being calculated through discrete Fourier transform utilizing data arrays of said sampled first signal and said sampled second signal, a data array of said noise signal, and instantaneous data arrays of a sine function of said single frequency signal and a cosine function of said single frequency signal; and wherein said step of compensating said position detecting signal gain according to a difference between a first predetermined value and said open-loop gain of said head positioning servo further includes the steps of:

calculating a value of said first predetermined value divided by said calculated open-loop gain of said head positioning servo;

determining a compensation value wherein said calculated value is directly set as a compensation ratio if said calculated value is within a range of a predetermined lower limit to a predetermined upper limit, wherein said predetermined lower limit is set as said compensation ratio if said calculated value is smaller than said predetermined lower limit, and wherein said predetermined upper limit is set as said compensation ratio if said calculated value exceeds said predetermined upper limit; and calculating said compensated position detecting signal gain by multiplying said position detecting signal gain by said determined compensation ratio.

4. The method for compensating a head positioning servo of claim 1, said method further comprising the step of:

compensating a drive control signal gain according to a difference between said open-loop gain of said head positioning servo and a second predetermined value.

5. The method for compensating a head positioning servo of claim 4, wherein said step of compensating said drive control signal gain according to a difference between said open-loop gain of said head positioning servo and a second predetermined value, further comprises the steps of:

calculating a value of (said drive control signal gain before compensation)×(said second predetermined value)/(said calculated open-loop gain of said head positioning servo); and determining a compensation value of said drive control signal gain wherein said calculated value is set as said compensation value of said drive control signal gain if said calculated value is within a range of a predetermined lower limit to a predetermined upper limit, wherein said predetermined lower limit is set as said compensation value of said drive control signal gain if said calculated value is smaller than said predetermined lower limit, and wherein said predetermined upper limit is set as said compensation value of said drive control signal gain if said calculated value exceeds said predetermined upper limit.

6. The method for compensating a head positioning servo of claim 1, said method further comprising the steps of:

reading a burst pattern from a disk surface corresponding to said head to be controlled;

causing said head to be controlled to follow said target position, wherein said head to be controlled and said corresponding disk surface are selected from among a plurality of disk surfaces and a plurality of heads separately provided for each of said plurality of disk surfaces; and compensating said position detecting signal gain only or both said position detecting signal gain and said drive control gain for said head.

7. The method for compensating a head positioning servo of claim 6, wherein said first predetermined value is an average of the open-loop gains for said plurality of heads, excluding a maximum value and a minimum value of said open-loop gain of said head positioning servo.

8. An apparatus for compensating a head positioning servo within a storage device, wherein the servo is provided for causing a head to read a burst pattern arranged in a direction of a track width on a disk surface, said apparatus comprising:

means for generating a position detecting signal indicating a head position according to the burst pattern read signal and a position detecting signal gain;

means for generating a drive control signal according to:
a difference between a value indicating a target position on the track and a value indicated by the position detecting signal and
a drive control signal gain;

means for moving the head according to the drive control signal to follow the target position;

means for calculating an open-loop gain of a head positioning servo when said head positioning servo causes said head to follow a predetermined position of a target track of a storage media surface by generating a first position detecting signal utilizing a first position detecting signal gain; and means for generating a second position detecting signal gain by compensating said first position detecting signal gain according to a difference between a first predetermined value, based on said first position detecting signal, and said open-loop gain of said head positioning servo.

9. The apparatus of claim 8, further comprising:

means for calculating a main position detecting signal and a slave position detecting signal on the basis of a burst pattern read signal and said position detecting signal gain, wherein said head positioning servo causes a head to read a burst pattern arranged in a direction of a track width on a storage media surface including a plurality of tracks to generate a burst pattern read signal;

means for selecting said main position detecting signal or said slave position detecting signal according to said head position in said track, wherein said selected signal is utilized as said position detecting signal; and means for compensating said position detecting signal gain so that a linkage between said main position detecting signal and said slave position detecting signal becomes continuous.

10. The apparatus of claim 8, wherein said means for calculating an open-loop gain of a head positioning servo, further comprises:

means for causing said head to follow said predetermined position in said target track utilizing said position detecting signal gain while supplying instantaneous data of a noise signal of a single frequency signal from an adding element provided in said head positioning servo to a servo loop at predetermined time intervals;

means for sampling a predetermined number of data items of a first signal added to said noise signal output from said adding element and a predetermined number of data items of a second signal supplied from said servo loop to said adding element at said predetermined time intervals; means for calculating said open-loop gain of said head positioning servo on the basis of components of said single frequency signal included in said first signal and said second signal, said components of said single frequency being calculated through discrete Fourier transform utilizing data arrays of said sampled first signal and said sampled second signal, a data array of said noise signal, and instantaneous data arrays of a sine function of said single frequency signal and a cosine function of said single frequency signal; and wherein said means for compensating said position detecting signal gain according to a difference between a first predetermined value and said open-loop gain of said head positioning servo further includes:

means for calculating a value of said first predetermined value divided by said calculated open-loop gain of said head positioning servo;

means for determining a compensation value wherein said calculated value is directly set as a compensation ratio if said calculated value is within a range of a predetermined lower limit to a predetermined upper limit, wherein said predetermined lower limit is set as said compensation ratio if said calculated value is smaller than said predetermined lower limit, and wherein said predetermined upper limit is set as said compensation ratio if said calculated value exceeds said predetermined upper limit; and means for calculating said compensated position detecting signal gain by multiplying said position detecting signal gain by said determined compensation ratio.

11. The apparatus of claim 8, further comprising:

means for compensating a drive control signal gain according to a difference between said open-loop gain of said head positioning servo and a second predetermined value.

12. The apparatus of claim 11, wherein said means for compensating said drive control signal gain according to a difference between said open-loop gain of said head positioning servo and a second predetermined value, further comprises:

means for calculating a value of (said drive control signal gain before compensation)×(said second predetermined value)/(said calculated open-loop gain of said head positioning servo); and means for determining a compensation value of said drive control signal gain wherein said calculated value is set as said compensation value of said drive control signal gain if said calculated value is within a range of a predetermined lower limit to a predetermined upper limit, wherein said predetermined lower limit is set as said compensation value of said drive control signal gain if said calculated value is smaller than said predetermined lower limit, and wherein said predetermined upper limit is set as said compensation value of said drive control signal gain if said calculated value exceeds said predetermined upper limit.

13. The apparatus of claim 8, further comprising:

means for reading a burst pattern from a disk surface corresponding to said head to be controlled;

means for causing said head to be controlled to follow said target position, wherein said head to be controlled and said corresponding disk surface are selected from among a plurality of disk surfaces and a plurality of heads separately provided for each of said plurality of disk surfaces; and means for compensating said position detecting signal gain only or both said position detecting signal gain and said drive control gain for said head.

14. The apparatus of claim 13, wherein said first predetermined value is an average of the open-loop gains for said plurality of heads, excluding a maximum value and a minimum value of said open-loop gain of said head positioning servo.

* * * * *